A. MONTAN.
TEST INDICATOR.
APPLICATION FILED JULY 27, 1908.
910,706.
Patented Jan. 26, 1909.
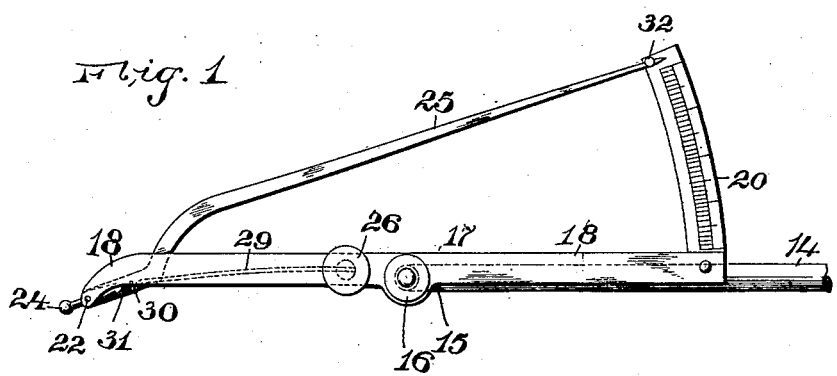
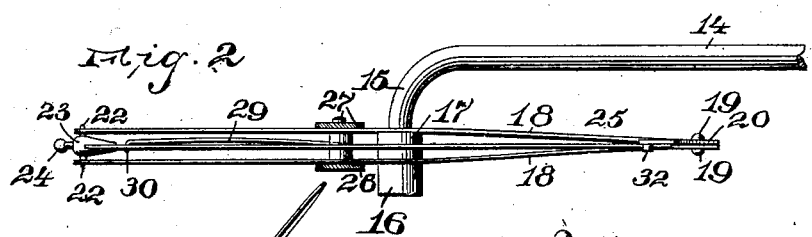
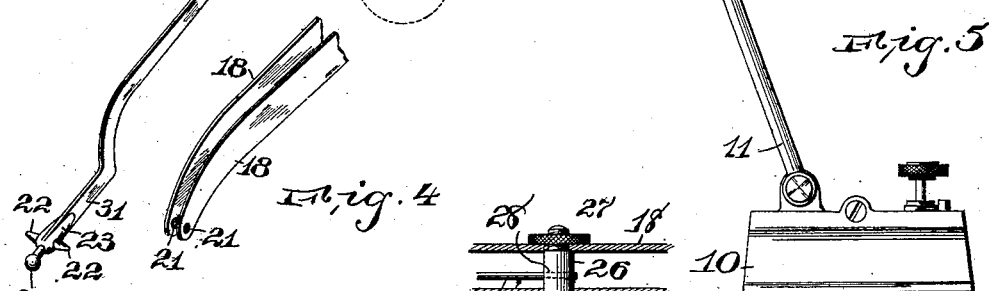
WITNESSES:
E. A. Pell
M. Johnson.
INVENTOR
Adolf Montan,
BY
Wm. H. Canfield
ATTORNEY

UNITED STATES PATENT OFFICE.

ADOLF MONTAN, OF NEWARK, NEW JERSEY.

TEST-INDICATOR.

No. 910,706.  Specification of Letters Patent.  Patented Jan. 26, 1909.

Application filed July 27, 1908. Serial No. 445,634.

*To all whom it may concern:*

Be it known that I, ADOLF MONTAN, a citizen of the United States, residing at Newark, in the county of Essex and State of New Jersey, have invented certain new and useful Improvements in Test-Indicators; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a test indicator that is adapted to be used in connection with a surface gage and also to be fastened in the tool-post of a lathe to show the slightest variation in the work that has been done.

The invention relates to an article of this kind that is cheaply and easily manufactured, is extremely light in weight, and whose main advantages are its easy assembling and dismantling so that there is no difficulty in making up a complete indicator from its parts.

The indicator also embodies a compact device, and one whose simplicity insures its successful operation and also one in which the bearings of the needle are constantly tight so that there is no lost motion in said bearings.

The invention is illustrated in the accompanying drawing, in which—

Figure 1 is a side view of the test indicator. Fig. 2 is a top view thereof. Fig. 3 is a perspective of the needle, and Fig. 4 is a perspective of the ends of the side pieces forming the bearing for the needle. Fig. 5 is a view showing the test indicator attached to the spindle of a gage and illustrating its application to a piece of work to detect the variation in the surface. Fig. 6 is a detail section of the means for adjusting the tension of the spring of the needle.

This test indicator is used to test and show the imperfections or truth of inside, outside or surface work, and is adapted to be attached to the spindle of a surface gage and used in connection with the same to show the slightest variation up to thousandths of an inch. The device is shown attached, as in Fig. 5, to a base 10, it being understood however that any other suitable fixture can be used, this base having a rocking rod 11 pivoted to the same, and around this rod 11 is arranged a clamp 12 with the thumb-screw 13 which provides for the clamping of a rod 14 in a fixed position, the rod 14 being bent as at 15 in Fig. 2, the nut 16 rigidly securing the rod to a block 17. The block 17 has secured thereto the side strips 18, one being arranged on each side of the indicator and being joined at the back by a rivet 19, one of said strips being extended to form the scale 20. This scale is preferably curved concentric with the pivot of the needle to be herein described, and is suitably subdivided so as to show differences in the surface of the work being tested.

The free ends of the side strips 18 are provided, as shown in Fig. 4, with the perforations 21, and when these side strips 18 are sprung apart, the perforations 21 which are tapered receive the oppositely placed tapered pins 22 which are fastened to a head 23 forming part of an arm of which the tapered pins 22 are the fulcrums. The short end of this arm forms a lever, called a head, having an indicating point 24, which point can be of any usual configuration, but being preferably shaped in the form of a sphere to minimize friction. The long end of the arm forms a telltale needle 25, the end of which is adapted to move along the scale on the scale plate 20, the location of the fulcrum, near the head 24, causing a multiplication of the movement of the telltale needle in comparison with the movement of the head 24.

It will be noted that the free end of the side strips 18 can be sprung apart and the pins 22 inserted in the perforations 21, the tapered perforations riding on the tapered pins and holding the pins tight, but permitting their rotation and at the same time overcoming any looseness in the bearing. The new device for adjusting the spring consists of a stud 26 and a nut 27 which are knurled to secure a good grip. Through this stud is drilled a hole 28 where the spring 29 is fastened. The spring has a hook 30 fitting under the portion 31 of the arm of the indicator so as to constantly keep the telltale needle elevated and hold it normally against a pin 32 which is recessed on its under side and receives and holds the needle against accidental displacement from its position against the scale plate 20. By turning the stud, any desired tension on the spring can be obtained. This stud, which is made a trifle shorter than the distance between the side strips 18, also holds said strips together and thus gives them enough tension for the bearings.

It will be noted from this description that the indicator is extremely simple in manufacture, easily assembled, and one in which the simplicity makes its operation sure.

Having thus described my invention, what I claim is:—

1. A test indicator comprising side plates arranged in substantially parallel relation, a scale plate on one end of one of the side plates, and an arm journaled between the free ends of the side plates, the arm being pivoted near one end so as to form a projecting head on its short end, the long end of the arm forming a telltale needle having its point adapted to move along the scale plate.

2. An indicator comprising a block, side plates secured to the block, a scale plate on one end of one of the side plates, the free end of the side plates forming bearings, an arm mounted in said bearings, the arm being pivoted near one of its ends, the short end forming a head and the long end forming a telltale needle adapted to move on the scale plate, means for limiting the movement of the telltale needle in one direction, and a spring acting to hold the needle against said limiting means.

3. An indicator comprising a block, side plates of spring material, a scale plate integral with one of the side plates on one end, and an arm pivotally mounted between the side plates on their free ends, the pivotal connection being maintained by the spring action of the side plates, the short end of the arm forming a head and the long end of the arm forming a telltale needle adapted to move along the scale plate.

4. An indicator comprising side plates secured together on one end, a scale plate on said end of one of the side plates, the free ends of the side plates being perforated, an arm having tapered pins on its opposite sides and adapted to enter the perforations of the side plates and to be held therein by the spring action of the side plates, the short end of the arm forming a head and the long end of the arm forming a telltale needle adapted to move along the scale plate, means for limiting the movement of the telltale needle, and a spring bearing on the needle to normally hold it against the limiting means.

5. An indicator comprising a block, side plates of spring material secured to the block, one end of the side plates being secured together, a scale plate integral with one of said side plates, the free ends of the side plates having tapered perforations, an arm having tapered pins on its opposite sides, the tapered pins being adapted to enter the perforations of the side plates and to be securely held therein by the spring action of the side plates, the short end of the arm projecting from an extension of the spring arms and forming a head, the long end of the arm forming a telltale needle adapted to move along the scale plate, a stud on the upper end of the scale plate acting to limit the movement of the needle, and a spring secured between the side plates and bearing on the under side of the needle to normally hold the needle against the stud.

6. An indicator comprising side plates arranged in substantially parallel relation, a scale plate on one end of the side plates, the free end of the side plates forming bearings and having perforations, an arm journaled between the free ends of the side plates, the arm forming a projecting head on one end and forming a telltale needle on its long end and adapted to have its point move along the scale plate, a stud passing through the side plates between their free ends, a nut on the end of the stud, and a spring engaging the arm and adapted to normally hold it upward and having its other end secured to the stud, whereby the turning of the stud will adjust the tension on the spring, the nut on the stud acting to lock the stud in its adjusted position and to give the side plates tension against the arm to secure the bearings.

7. An indicator comprising side plates having a needle pivoted in their free ends, a stud passing through the side plates, the stud having a perforation, a spring having one end in the perforation of the stud, and having its other end engaging the needle, means for limiting the movement of the needle, and a nut on the stud and adapted to lock the side plates and the stud in their adjusted positions so as to secure the spring and to force the side plates together to give their free ends sufficient tension to form a bearing.

In testimony, that I claim the foregoing, I have hereunto set my hand this 25th day of July 1908.

ADOLF MONTAN.

Witnesses:
E. A. PELL,
WM. H. CAMFIELD.